F. A. STEVENS.
OPHTHALMIC MOUNTING ADJUSTING DEVICE.
APPLICATION FILED APR. 7, 1919.
1,384,872.
Patented July 19, 1921.
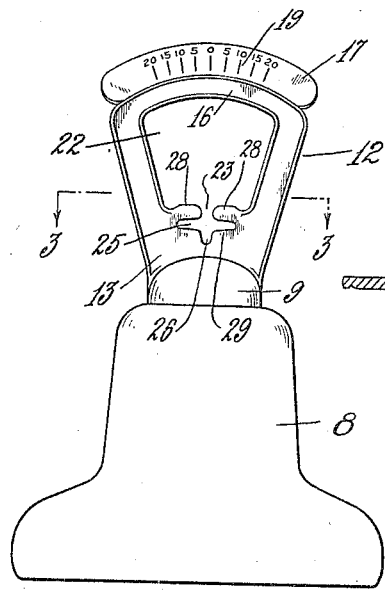
Fig. 1.
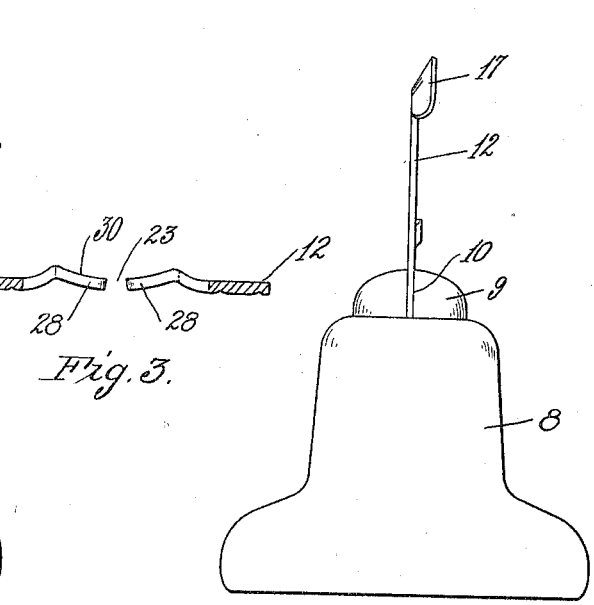
Fig. 3.
Fig. 2.
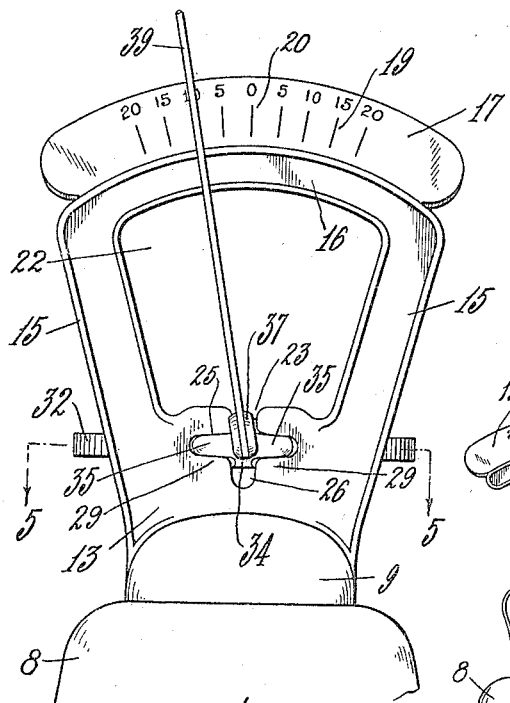
Fig. 4.
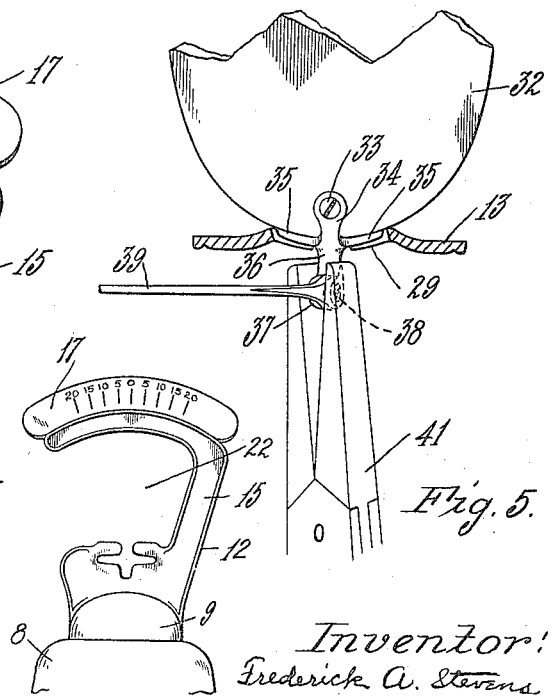
Fig. 6.
Fig. 5.
Inventor:
Frederick A. Stevens
By Horatio E. Bellows
Attorney

UNITED STATES PATENT OFFICE.

FREDERICK A. STEVENS, OF PROVIDENCE, RHODE ISLAND, ASSIGNOR TO STEVENS AND COMPANY, INCORPORATED, A CORPORATION OF RHODE ISLAND.

OPHTHALMIC-MOUNTING-ADJUSTING DEVICE.

1,384,872.  Specification of Letters Patent.  Patented July 19, 1921.

Application filed April 7, 1919. Serial No. 288,211.

*To all whom it may concern:*

Be it known that I, FREDERICK A. STEVENS, citizen of the United States, residing at Providence, in the county of Providence and State of Rhode Island, have invented certain new and useful Improvements in Ophthalmic - Mounting - Adjusting Devices, of which the following is a specification.

My device relates to a new article of manufacture for adjusting ophthalmic mountings.

It is frequently necessary to vary the angle of the temples relatively to the plane of the lenses to accommodate the same to the face of the particular wearer. To determine the desired degree of this angle it has been customary to use a test frame and thereafter, before mounting the lenses, to manually twist the end piece by guess to approximately the required angle, and then insert the lenses. If the result was not satisfactory the lenses had to be detached and the end piece again angled. Were any torsional bending of the end piece attempted when the lenses were attached the strain would fracture the lenses; and the bending operation even, in the absence of lenses could not be made with accuracy without undue labor.

The essential objects of my invention are to prevent distortion or injury of the arms and ears; to enable the torsional bending of the end piece while the lenses are engaged without danger of breaking the lenses; to attain the required angle exactly and without experiment; and to attain these ends in a simply operated and inexpensive structure.

To the above ends essentially my invention consists in such parts and in such combinations of parts as fall within the scope of the appended claims.

In the accompanying drawings which form a part of this specification—

Figures 1 and 2, are front and side elevations respectively of my novel device,

Fig. 3, a section on line 3—3 of Fig. 1,

Fig. 4, an enlarged front elevation of the frame with a spectacle mounting engaged therein, Fig. 5, a section of the same on line 5—5 of Fig. 4, showing a portion of a pair of pliers in perspective, and Fig. 6, a reduced front elevation of a modified form of frame.

Like reference characters indicate like parts throughout the views.

My device in its present and preferred form of embodiment comprises a heavy base or standard 8 with a reduced top portion 9 having a bifurcation 10 in which is fixed in any convenient manner a substantially flat vertically disposed open frame 12. In detail the frame comprises in a single integral plate, a base portion 13 radial or outwardly inclined arms or sides 15, and a transverse or top portion 16 connecting the upper ends of the arms. The portion 16 has an arched extension 17 provided with graduations 19. The central graduation 20 is marked zero, and at each side of this the graduation marks bear numerals of increasing denominations indicating angular degrees. There is a resultant central opening 22 in the frame. In the portion 13 of the frame in alinement with the graduation 20 is a vertical slot 23 extending from the opening 22 to the medial portion of a horizontal slot or opening 25. Centrally of the slot 25 is a cavity or slot 26 in continuation of the slot 23. The slots 23 and 25 form inwardly directed fingers 28. The fingers and the portions 29 of the frame immediately below the fingers are preferably transversely curved to afford a curved seat or bearing face 30.

My device is used as follows. A lens 32 has attached thereto in the usual manner by a screw 33 the straps 34 and arms 35 of a post or end piece 36 carrying in its bifurcated portion or ears 37, in which is fixed by a screw 38, a temple 39. The edge of the lens is placed against the curved area 30 of the frame 12 with the arms 35 seated in the slot 25 and with the straps 34 extending into the slots 23 and 26. The end piece portion 36 projects through the slot 25. By pliers 41 or other suitable implement the portion 37 is grasped and turned to one side by a torsional movement as shown in Fig. 5. This movement is continued until the temple 39 comes into alinement with the particular graduation 19 which indicates the degree of angle sought in this particular case, as shown in Fig. 4. It will be noted that during the torsional bending the arms 35 are seated firmly and rigidly held by the material bounding the slot so that no tilting of the arms occurs, and no strain whatever is transmitted to the lens 32, and no strain extends toward the lens beyond the portion 36.

It will be further noted that by means of the scale any predetermined degree of angularity can be instantly and accurately attained.

In Fig. 6 is shown a modified form of frame wherein one of the arms 15 is omitted. The shape of the opening 22 is immaterial so long as there is room for convenient insertion of the temple therethrough.

I claim,—

1. In an optical adjusting device, the combination of a base, and a frame on the base provided with an opening and with an oblong slot adjacent to the opening, there being inwardly directed fingers with spaced ends intermediate the opening and the slot, the space between the finger ends intersecting said slot.

2. In an optical adjusting device, the combination of a base, and a frame on the base having an opening and provided with a slot extending from the opening, and with an oblong slot communicating at its medial portion with the first slot and at right angles to the first slot, and with a cavity extending from the oblong slot in alinement with the first slot.

3. In an optical adjusting device the combination with the base, of a frame on the base provided with an opening and with an oblong slot adjacent to the opening, and inwardly directed oppositely disposed spaced fingers on the frame, the space between the fingers extending from the opening to the slot, said frame and fingers being provided with a lateral concave depression constituting a seat.

4. In an optical adjusting device, the combination of a base, a frame on the base provided with an opening and with an oblong slot adjacent the opening, there being inwardly directed fingers with spaced ends, the space between the fingers extending from the opening to the slot and a graduated scale on the frame above the fingers.

5. In an optical adjusting device, a base, a frame on the base provided with an opening and with an oblong slot adjacent the opening, there being inwardly directed fingers with spaced ends between the opening and the slot, the space between said ends communicating with said slot, there being a scale on the frame for coöperating with a temple positioned or located by said slot and finger.

6. In an optical adjusting device, a base, an arm supported thereby, an arched portion at the upper end of said arm, a portion at the lower end of said arm having a T-shaped slot the axis of one member thereof extending in the direction of the central point of said arched portion.

7. In an optical adjusting device, a base, and an open frame on the base provided with slots angularly disposed with relation to each other, there being a scale the central portion of which is in vertical alinement with one of said slots.

In testimony whereof I have affixed my signature.

FREDERICK A. STEVENS.